United States Patent
Pan et al.

(10) Patent No.: US 10,969,673 B2
(45) Date of Patent: Apr. 6, 2021

(54) POLARIZATION ROTATION DEVICE AND PROJECTION DEVICE

(71) Applicant: Coretronic Corporation, Hsin-Chu (TW)

(72) Inventors: Haw-Woei Pan, Hsin-Chu (TW); Yao-Shun Lin, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/673,977

(22) Filed: Nov. 5, 2019

(65) Prior Publication Data

US 2020/0150520 A1 May 14, 2020

(30) Foreign Application Priority Data

Nov. 9, 2018 (CN) .......................... 201811329661.3

(51) Int. Cl.
| | |
|---|---|
| *G03B 21/20* | (2006.01) |
| *H04N 9/31* | (2006.01) |
| *G02B 5/30* | (2006.01) |
| *G02B 30/25* | (2020.01) |

(52) U.S. Cl.
CPC ........... *G03B 21/2073* (2013.01); *G02B 5/30* (2013.01); *G02B 30/25* (2020.01); *H04N 9/3167* (2013.01)

(58) Field of Classification Search
CPC .... G03B 21/207; G03B 35/16; H04N 9/3111; H04N 9/3114; H04N 9/3167; H04N 13/337; G02B 30/25

USPC .............................................................. 353/8
See application file for complete search history.

(56) References Cited

U.S. PATENT DOCUMENTS

2018/0299662 A1* 10/2018 Maes .................... H04N 9/3167
2019/0250489 A1* 8/2019 Ikeda ................. G03B 21/2013

FOREIGN PATENT DOCUMENTS

| CN | 102854731 | 11/2015 |
|---|---|---|
| CN | 105659161 | 6/2016 |
| TW | I597556 | 9/2017 |

* cited by examiner

*Primary Examiner* — Ryan D Howard
(74) *Attorney, Agent, or Firm* — JCIPRNET (57) ABSTRACT

A polarization rotation device including a rotation shaft, a driving element, a polarization element and a reflective element is provided. The polarization element is disposed on a transmission path of the at least one excitation light beam. The reflective element is disposed on a side of the polarization element. The driving element drives the polarization element to sequentially rotate with the rotation shaft as a rotation center axis. When the polarization element rotates, the excitation light beam is transmitted to the polarization element and passes through the polarization element and is again transmitted to and passes through the polarization element by the reflective element. The excitation light beam outputting from the polarization rotation device has different polarization states at different time periods. A projection device applying the polarization rotation device of the invention achieves the effect of uniform color or brightness when displaying images in a 3D display mode.

18 Claims, 6 Drawing Sheets

POLARIZATION ROTATION DEVICE AND PROJECTION DEVICE

CROSS-REFERENCE TO RELATED APPLICATION

This application claims the priority benefit of China application serial no. 201811329661.3, filed on Nov. 19, 2018. The entirety of the above-mentioned patent application is hereby incorporated by reference herein and made a part of this specification.

BACKGROUND

1. Field of the Invention

The invention relates to a rotation device and an optical device, and more particularly, relates to a polarization rotation device and a projection device.

2. Description of Related Art

A projection device is a display device for generating large image frames, and has been continuously improved with the evolution and innovation of technology. As the imaging principle of the projection device, an illumination system generated by an illumination system is converted into an image light beam by a light valve so then the image light beam can be projected to a projection target (a screen or a wall surface) through a projection lens, so as to form projection frames.

Further, in response to the market requirements for the projection device related to brightness, color saturation, service life, non-toxic environmental protection and the like, the illumination system has also been evolved into the most advanced laser diode (LD) source, all the way from the ultra-high-performance lamp (UHP lamp), light-emitting diode light-emitting diode (LED) and so on. In the illumination system, the current cost-effective approach for generating red light and green light is to use a blue laser diode for emitting an excitation light beam to a fluorescent color wheel so the excitation light beam can excite the phosphor of the fluorescent color wheel to generate yellow-green light. Next, the desired red light or green light may then be filtered for use by a filter element.

However, in the known light system architectures, a polarization polarity of the excitation light beam entering the projection device will be destroyed by optical elements inside the projection device, such that polarization directions and intensities of beams projected from the projection device become inconsistent. Therefore, when the projection device generates display frames with stereo images in a polarization stereo mode (by adding a polarizer outside the lens), image frames projected from the lens and the polarizer may appear in uneven color or uneven brightness.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY

The invention provides a polarization rotation device and a projection device. In the polarization stereo mode, the projection can achieve display images with uniform color and brightness so the user can observe stereoscopic display with better uniformity.

Other objects and advantages of the invention can be further illustrated by the technical features broadly embodied and described as follows.

To achieve one, a part, or all of the above objectives or other objectives, an embodiment of the invention proposes a polarization rotation device, which includes a rotation shaft, a driving element, a polarization element and a reflective element. The driving element is connected to the rotation shaft to drive the rotation shaft to rotate. The polarization element is connected to the rotation shaft and disposed on a transmission path of the at least one excitation light beam. The reflective element is disposed on a side of the polarization element facing the driving element and located between the polarization element and the driving element. The driving element is configured to drive the polarization element to sequentially rotate with the rotation shaft as a rotation center axis. When the polarization element rotates, the at least one excitation light beam is transmitted to the polarization element and passes through the polarization element and is again transmitted to and passes through the polarization element by reflection of the reflective element. The at least one excitation light beam outputting from the polarization rotation device has different polarization states at different time periods.

To achieve one, a part, or all of the above objectives or other objectives, an embodiment of the invention proposes a projection device, which includes an illumination system, at least one light valve and a projection lens. The illumination system is configured to provide an illumination light beam, and the illumination system includes at least one excitation light source and a polarization rotation device. The at least one excitation system is configured to provide at least one excitation light beam. The polarization rotation device includes a rotation shaft, a driving element, a polarization element and a reflective element. The driving element is connected to the rotation shaft to drive the rotation shaft to rotate. The polarization element is connected to the rotation shaft and disposed on a transmission path of the at least one excitation light beam. The reflective element is disposed on a side of the polarization element facing the driving element and located between the polarization element and the driving element. The illumination light beam includes a part of the at least one excitation light beam. The at least one light valve is disposed on a transmitting path of the illumination light beam, and configured to convert the illumination light beam into an image light beam. The projection lens is disposed on a transmission path of the image light beam and configured to convert the image light beam into a projection light beam. The driving element is configured to drive the polarization element to sequentially rotate with the rotation shaft as a rotation center axis. When the polarization element rotates, the at least one excitation light beam is transmitted to the polarization element and passes through the polarization element and is again transmitted to and passes through the polarization element by reflection of the reflective element. The at least one excitation light beam outputting from the polarization rotation device has different polarization states at different time periods.

Based on the above, the embodiments of the invention have at least one of the following advantages and effects. In the polarization rotation device or the projection device disposed with the polarization rotation device of then invention, the driving element is configured to drive the polarization element to rotate with the rotation shaft as the rotation center axis. Therefore, the excitation light beam may pass through the polarization element, and may then be transmitted to pass through the polarization element by reflection of the reflective element. The excitation light beam outputting from the polarization rotation device has different polarization states at different time periods. As a result, when the projection device in the polarization stereoscopic mode (i.e., with the polarizers additionally disposed outside the projection lens), the display images may have uniform color or brightness so the user can observe the 3D display with better uniformity through the polarization stereoscopic glasses.

To make the above features and advantages of the invention more comprehensible, several embodiments accompanied with drawings are described in detail as follows.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Reference will now be made in detail to the present preferred embodiments of the invention, examples of which are illustrated in the accompanying drawings. Wherever possible, the same reference numbers are used in the drawings and the description to refer to the same or like parts.

It is to be understood that both the foregoing and other detailed descriptions, features and advantages are intended to be described more comprehensively by providing an embodiment accompanied with figures hereinafter. The language used to describe the directions such as up, down, left, right, front, back or the like in the reference drawings is regarded in an illustrative rather than in a restrictive sense. Thus, the language used to describe the directions is not intended to limit the scope of the invention.

Figure 1:
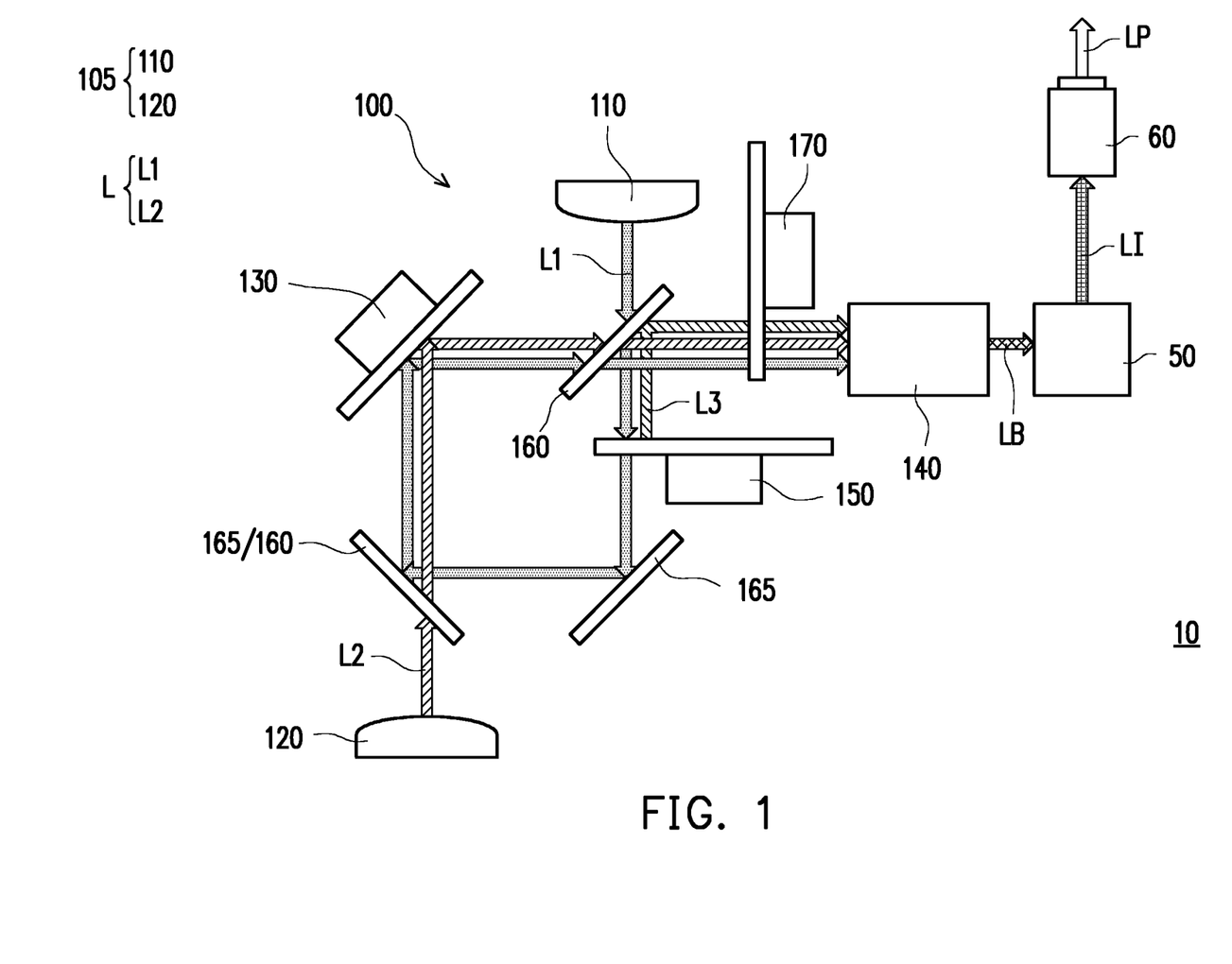
FIG. 1 is a schematic diagram of the projection device according to an embodiment of the invention.

FIG. 1 is a schematic diagram of the projection device according to an embodiment of the invention. With reference to FIG. 1, in this embodiment, a projection device 10 is used for providing a projection light beam LP. Specifically, the projection device 10 includes an illumination system 100, at least one light valve 50 and a projection lens 60, and the illumination system 100 is configured to provide an illumination light beam LB. The light valve 50 is disposed on a transmitting path of the illumination light beam LB and configured to convert the illumination light beam LB into at least one image light beam LI. The so-called illumination light beam LB refers to a light beam provided to the light valve 50 by the illumination system 100 at any time. The projection lens 60 is disposed on a transmission path of the image light beam LI and configured to convert the image light beam LI into a projection light beam LP. The projection light beam LP is projected from the projection device 10 to a projection target (not illustrated), such as a screen or a wall surface.

When being applied in the 3D (three-dimensional) display technology, the projection device 10 may be applied as a polarization stereoscopic image projector. Specifically, when two projection devices 10 are in the polarization stereoscopic mode (i.e., when polarizers with different polarization directions are disposed outside the projection lenses 60 of two projection devices 10 or polarizers with different polarization directions are built in two projection devices 10), the two projection devices 10 may be used to provide the projection light beam LP through the polarizers for generating images with different polarization states so the user can observe the 3D display frames through a polarization stereoscopic glasses. For example, the polarization stereoscopic glasses worn by the user may be disposed with two polarization elements for the left glass and the right glass. The two polarization elements are corresponding to the images with different polarization states generated by the polarizers of the projection devices so the effect of the 3D display can achieved when the left and right eyes of the user respectively receive the images projected by the projector.

Specifically, in this embodiment, the light valve 50 is, for example, a reflective light modulator such as a liquid crystal on silicon panel (LCoS panel), a digital micro-mirror device (DMD) and the like. In certain embodiments, the light valve 50 may also be a transmissive light modulator such as a transparent liquid crystal panel), an electro-optical modulator, a Magneto-optic modulator, an acousto-optic modulator (AOM) and the like. Forms and types of the light valve 50 are not particularly limited by the invention. Enough teaching, suggestion, and implementation illustration for detailed steps and embodiments regarding how the light valve 50 converts the illumination light beam LB into the image light beam LI may be obtained with reference to common knowledge in the related art, which is not repeated hereinafter. In this embodiment, the number of the at least one light valve 50 is one (e.g., the projection device 10 uses a single digital micro-mirror device (1-DMD)), but may also be more than one in other embodiments. The invention is not limited in this regard.

The projection lens 60 includes, for example, a combination of one or more optical lens with refractive powers, such as various combinations among non-planar lenses including a biconcave lens, a biconvex lens, a concavo-convex lens, convexo-convex lens, a plano-convex and a plano-concave lens. In an embodiment, the projection lens 60 may also include a flat optical lens for projecting the image light beam LI from the light valve 50 to the projection target in reflective or transmissive manner. Forms and types of the projection lens 60 are not particularly limited by the invention.

Moreover, in certain embodiments, the projection device 10 may also selectively include optical elements with concentration, refraction or reflection functions, which are used to guide the illumination light beam LB emitted by the illumination system 100 to the light valve 50, and used to guide the image light beam LI generated by the light valve 50 to the projection lens 60, so as to generate the projection light beam LP. However, the invention is not limited in this regard.

The illumination system 100 includes at least one light source 105, a polarization rotation device 130 and a light uniformizing element 140. Specifically, the illumination system 100 further includes a wavelength conversion element 150, at least one light splitting element 160, at least one reflective element 165 and a filter device 170.

The light source 105 is configured to provide at least one light beam L. Specifically, the light source 105 includes an excitation light source 110 and an auxiliary light source 120. The excitation light source 110 provides an excitation light beam L1, and the auxiliary light source 120 provides an auxiliary light beam L2. In this embodiment, the excitation light source 110 is a laser diode (LD) capable of emitting a blue excitation light beam and may also be a laser diode array. The auxiliary light source 120 is a laser diode capable of emitting a red excitation light beam or a light-emitting diode (LED) capable of emitting a red light beam, and may also be a laser diode array or a light-emitting diode array. In other words, in this embodiment, each of the at least one light source 105 is an excitation light beam emitting device.

The wavelength conversion element 150 is disposed on a transmission path of the excitation light beam L1 and located between the excitation light source 110 and the light uniformizing element 140. The wavelength conversion element 150 has a wavelength conversion material for converting the excitation light beam L1 into an excited light beam L3, and then the excited light beam L3 is reflected back to the light splitting element 160. The wavelength conversion element 150 further includes a light transmissive region for allowing the excitation light beam L1 to pass through. In this embodiment, the blue excitation light beam is converted into a green excited light beam, a yellow excited light beam or a green-yellow excited light beam by using, for example, the wavelength conversion material. In different embodiments, configuration of the wavelength conversion material of the wavelength conversion element 150 may be changed according to different types of the illumination system 100. Forms and types of configuration of the wavelength conversion element 150 are not particularly limited by the invention.

The at least one light splitting element 160 is disposed on the transmission path of the excitation light beam L1 and/or the auxiliary light beam L2, and the at least one reflective element 165 is configured to reflect or guide said beams. For instance, in this embodiment, the at least one light splitting element 160 includes a dichroic mirror that reflects blue light (DMB) and a dichroic mirror that reflects green and orange light (DMGO). Here, the dichroic mirror that reflects blue light (the light splitting element 160) is located between the auxiliary light source 120 and the polarization rotation device 130, and configured to reflect the excitation light beam L1 passing through the wavelength conversion element 150 and allow the auxiliary light beam L2 generated from the auxiliary light source 120 to pass through. The dichroic mirror that reflects green and orange light (the light splitting element 160) is located between the filter device 170 and the polarization rotation device 130, and configured to reflect the excited light beam L3 and allow the excitation light beam L1 and the auxiliary light beam L2 to pass through, so that all the required beams can be collected and transmitted to the filter device 170. In different embodiments, configurations and types of the light splitting element 160 and the reflective element 165 may be changed according to different types of the illumination system 100. Forms and types of configuration of the light splitting element 160 and the reflective element 165 are not particularly limited by the invention.

The filter device 170 is disposed between the excitation light source 110 and the light uniformizing element 140, and is also located between the dichroic mirror that reflects green and orange light (the light splitting element 160) and the light uniformizing element 140. The filter device 170 has filters in different colors for allowing the auxiliary light beam L2 and the excited light beam L3 to pass through, so as to correspondingly generate a red light part and a green light part of the illumination light beam LB. The filter device 170 has a diffuser or a light transmissive region for allowing the excitation light beam L1 to pass through, so as to correspondingly generate a blue part of the illumination light beam LB. Specifically, in this embodiment, the filter device 170 is a rotatable filter wheel device, configured to sequentially produce diffusion and/or filter effects on the excitation light beam L1, the auxiliary light beam L2 or the excited light beam L3, so as to increase a color purity of the beams passing through the filter device 170. In different embodiments, configuration of the filters in different colors in the filter device 170 may be changed according to different types of the illumination system 100. Forms and types of the filter device 170 are not particularly limited by the invention.

The light uniformizing element 140 is configured to allow a part of the at least one excitation light beam L1 to pass through, so as to form the illumination light beam LB. That is to say, the light uniformizing element 140 is disposed on the transmission path of the excitation light beam L1, the auxiliary light beam L2 and the excited light beam L3 and configured to adjust light spot shapes of the said beams, so that a light spot shape of the illumination light beam LB outputting from the light uniformizing element 140 can match a shape of a working region (e.g., a rectangle) of the light valve 50 and have identical or similar light intensity throughout the light spot. In this embodiment, the light uniformizing element 140 is, for example, an integration rod. In other embodiments, the light uniformizing element 140 may also be other optical elements in other appropriate forms, which are not particularly limited by the invention.

Figure 2A:
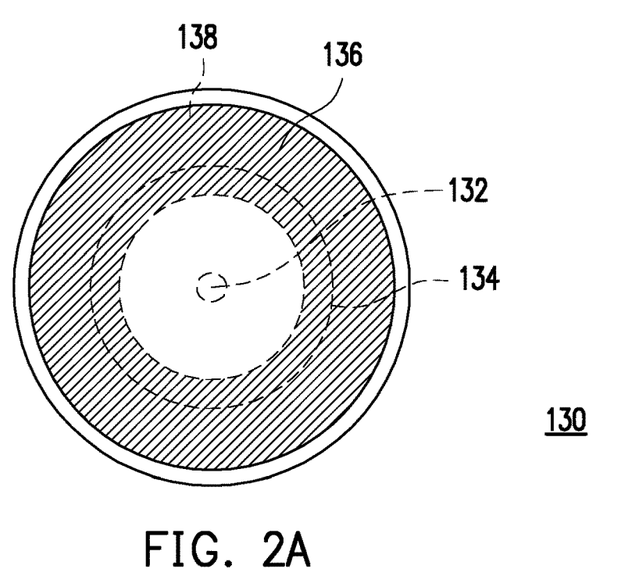
FIG. 2A and FIG. 2B are respectively a top view and a side view of the polarization rotation device of the projection device of FIG. 1.
Figure 2B:
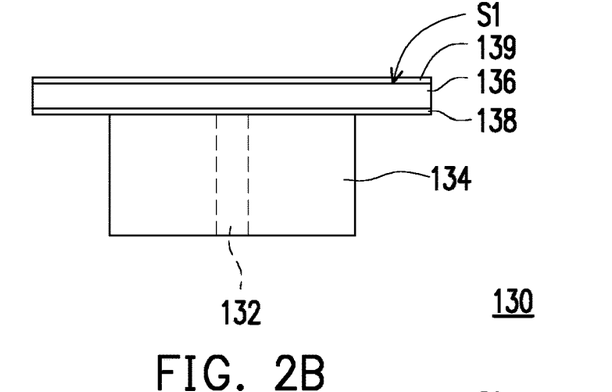

FIG. 2A and FIG. 2B are respectively a top view and a side view of the polarization rotation device of the projection device of FIG. 1. The following description refers to FIG. 1, FIG. 2A and FIG. 2B. The polarization rotation device 130 is a reflective rotation wheel configured to sequentially produce the effect of changing the polarization state of the excitation light beam L1 or the auxiliary light beam L2. Specifically, the polarization rotation device 130 includes a rotation shaft 132, a driving element 134, a polarization element 136 and a reflective element 138. The polarization element 136 is disposed on the transmission path of the excitation light beam L1. The polarization element 136 is connected to the rotation shaft 132. The driving element 134 is configured to drive the rotation shaft 132 to rotate, and thereby drive the polarization element 136 to sequentially rotate with the rotation shaft 132 as a rotation center axis. The reflective element 138 is disposed on a side of the polarization element 136 facing the driving element 134 and located between the polarization element 136 and the driving element 134. In other words, in this embodiment, when the polarization element 136 rotates, the excitation light beam L1 is transmitted to the polarization element 136 and passes through the polarization element 136 and is again transmitted to and passes through the polarization element 136 by reflection of the reflective element 138. Also, the excitation light beam L1 outputting from the polarization rotation device 130 has different polarization states at different time periods. Similarly, the auxiliary light beam L2 transmitted to the polarization element 136 has the same effect of different polarization states at different time periods.

In this embodiment, the driving element 134 is, for example, a motor, disposed at a center of the polarization element 136 (i.e., connected to the rotation shaft 132), but the invention is not limited thereto. The polarization element 136 may be, for example, a half-wave plate, a quarter-wave plate, a depolarizer, a circular polarizer, or a combination of the quarter-wave plate and a linear polarizer. The reflective element 138 is formed in a coating manner on the side of the polarization element 136 facing the driving element 134. In this embodiment, the excitation light beam L1 is transmitted to a central region of the polarization element 136. Specifically, the polarization element 136 includes the central region and a peripheral region, and the peripheral region surrounds the central region. In this way, the polarization element 136 being used may be further downsized, so that a material cost of the polarization rotation device 130 can be reduced accordingly. Specifically, the excitation light beam L1 is incident on the polarization element 136 and forms a light spot on the polarization element 136, and a distance between a geometric center position of the light spot and a central position of the central region of the polarization element 136 is less than or equal to 10 mm. For instance, if the excitation light beam L1 is irradiated onto the central region of the polarization element 136 and the excitation light beam L1 forms the light spot with a diameter of about 10 mm, a diameter of the polarization element 136 can be only 20 mm. In comparison with the related art where the excitation light beam is irradiated onto the periphery of the transmissive polarization element, the polarization element of the invention is smaller in size, so that the overall cost of the projection device can be reduced.

Specifically, when the excitation light beam L1 is incident on the polarization element 136, the excitation light beam L1 has an included angle less than or equal to 85 degrees with respect to a light incidence surface S1 of the polarization element 136, as shown in FIG. 1 and FIG. 2B. In other words, the excitation light beam L1 is obliquely incident on the polarization element 136. It should be noted that, in this embodiment, the polarization rotation device 130 may further include an anti-reflection layer 139 disposed on the light incidence surface S1 of the polarization element 136, where the light incidence surface S1 is located on a side far away from the driving element 134. The anti-reflection layer 139 is formed in a coating manner on the light incidence surface S1 of the polarization element 136, but the invention is not limited thereto. Accordingly, a transmittance of the excitation light beam L1 or the auxiliary light beam L2 entering the polarization element 136 may be further increased.

Since the excitation light beam L1 is a polarized light (with linear polarization), the polarization state of the excitation light beam L1 will be changed due to the type of the polarization element 136 after passing through the polarization element 136. Therefore, as the excitation light beam L1 passes through the polarization element 136 when the polarization element 136 is driven by the driving element 134 to rotate, the excitation light beam L1 passing through the polarization element 136 has different polarization states at different time periods. In other words, when the illumination system 100 is in operation, the excitation light beam L1 is rapidly and continuously switched into outputting light beams with different polarization directions by rotation of the polarization rotation device 130. Here, the exiting light beams have the same light intensity. In addition, because the excitation light beam L1 with different polarization directions is controlled within a range that cannot be perceived by the human eye by the speed at which the polarization rotation device 130 rotates, the human eye will perceive the images with uniform intensity and without specific polarization direction. Accordingly, when two projection devices 10 are in the polarization stereoscopic mode (i.e., when polarizers are disposed outside the projection lenses 60 or polarizers are built in two projection devices 10), after passing through the polarization rotation devices 130 of two projection devices 10 and the sequentially passing the projection lenses 60 and the polarizers, the beams can form the images with uniform color and brightness on the screen so that the user can observe the 3D display with better uniformity through the polarization stereoscopic glasses. Similarly, the auxiliary light beam L2 or other light beams transmitted to the polarization element 136 will receive the same effect, which is not repeated hereinafter.

In certain embodiments, the reflective element 138 may include a diffusion layer (not illustrated), which is formed by, for example, adding diffusion particles into the reflective element 138 and configured to scatter the excitation light beam L1 so the reflected excitation light beam L1 can receive the effect of diffusion. In certain embodiments, a diffusion structure may be disposed on a surface of the reflective element 138 facing the polarization element 136 or on a surface of the polarization element 136 facing the reflective element 138 by, for example, forming a rough surface on said surfaces so the excitation light beam L1 incident on the above surfaces can receive the effect of diffusion. In other words, in certain embodiments, the polarization rotation device 130 including the diffusion layer can replace an additional diffusion device, so as to reduce the size and save cost for the projection device. However, the invention is not limited in this regard. That is to say, in the embodiment of FIG. 1, the diffusion particles or other structures with the effect of diffusing the light beams may be selectively combined with the polarization rotation device 130 or the filter device 170.

Figure 3:
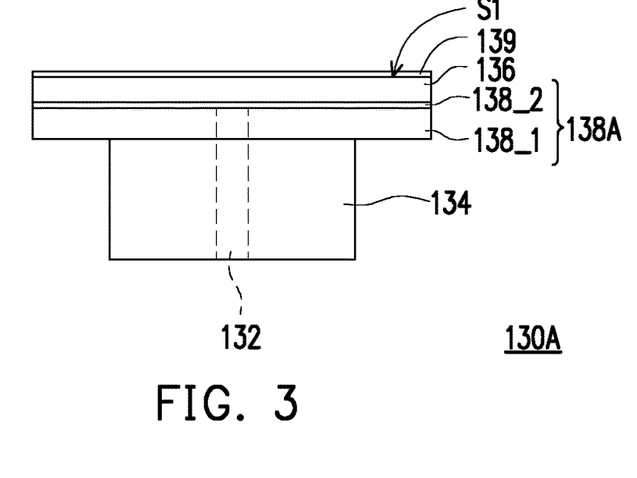
FIG. 3 is a side view of a polarization rotation device according to another embodiment of the invention.

FIG. 3 is a side view of a polarization rotation device according to another embodiment of the invention. The following description refers to FIG. 3. A polarization rotation device 130A of this embodiment is similar to the polarization rotation device 130 of FIG. 2B. The difference between the two is that the reflective element 138 includes a body 138_1 and a reflective layer 138_2 in this embodiment. The reflective layer 138_2 is formed on the body 138_1, and the reflective layer 138_2 is located between the body 138_1 and the polarization element 136. Specifically, in this embodiment, the body 138_1 is, for example, a glass substrate, and the reflective layer 138_2 is, for example, a reflective material formed in a coating manner on a surface of the body 138_1 facing the polarization element 136. Accordingly, the manufacturing process of the polarization rotation device 130A may be simplified. In this embodiment, the polarization rotation device 130 may be selectively added in with the diffusion articles or other structures with the effect of diffusing the light beams so the excitation light beam L1 incident on the polarization rotation device 130 can receive the effect of diffusion. The invention is not limited in this regard.

Figure 4:
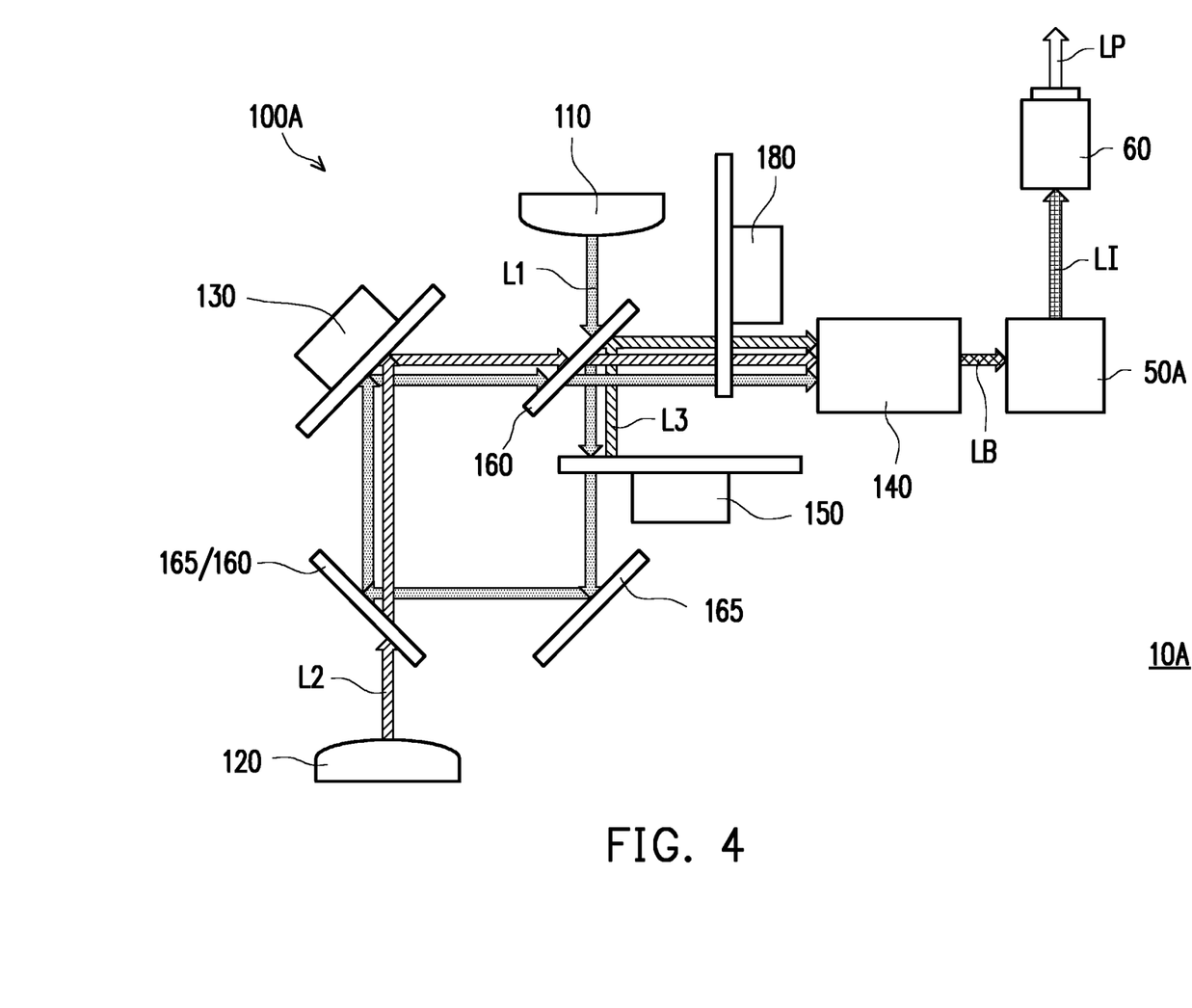
FIG. 4 is a schematic diagram of the projection device according to another embodiment of the invention.

FIG. 4 is a schematic diagram of the projection device according to another embodiment of the invention. The following description refers to FIG. 4. A projection device 10A of this embodiment is similar to the projection device 10 of FIG. 1. The difference between the two is that an illumination system 100A of the projection device 10A further includes a diffusion element 180 in this embodiment. The diffusion element 180 is a rotation wheel configured to allow the excitation light beam L1, the auxiliary light beam L2 or the excited light beam L3 to pass through and receive the effect of diffusion. In addition, in this embodiment, the number of the light valves 50A is two (e.g., the projection device 10 uses two digital micro-mirror devices (2-DMD)). Therefore, in this embodiment, because the light beams of different colors in the illumination light beam LB may be correspondingly and respectively transmitted to the different digital micro-mirror devices through configuration of optoelectronic modules of an optical system in the projection device 10A, it is not required to dispose the filter device 170 (shown in FIG. 1). Accordingly, in the polarization stereoscopic mode, the images with uniform color and brightness may be generated on the screen so the user can observe the 3D display with better uniformity through the polarization stereoscopic glasses.

Figure 5:
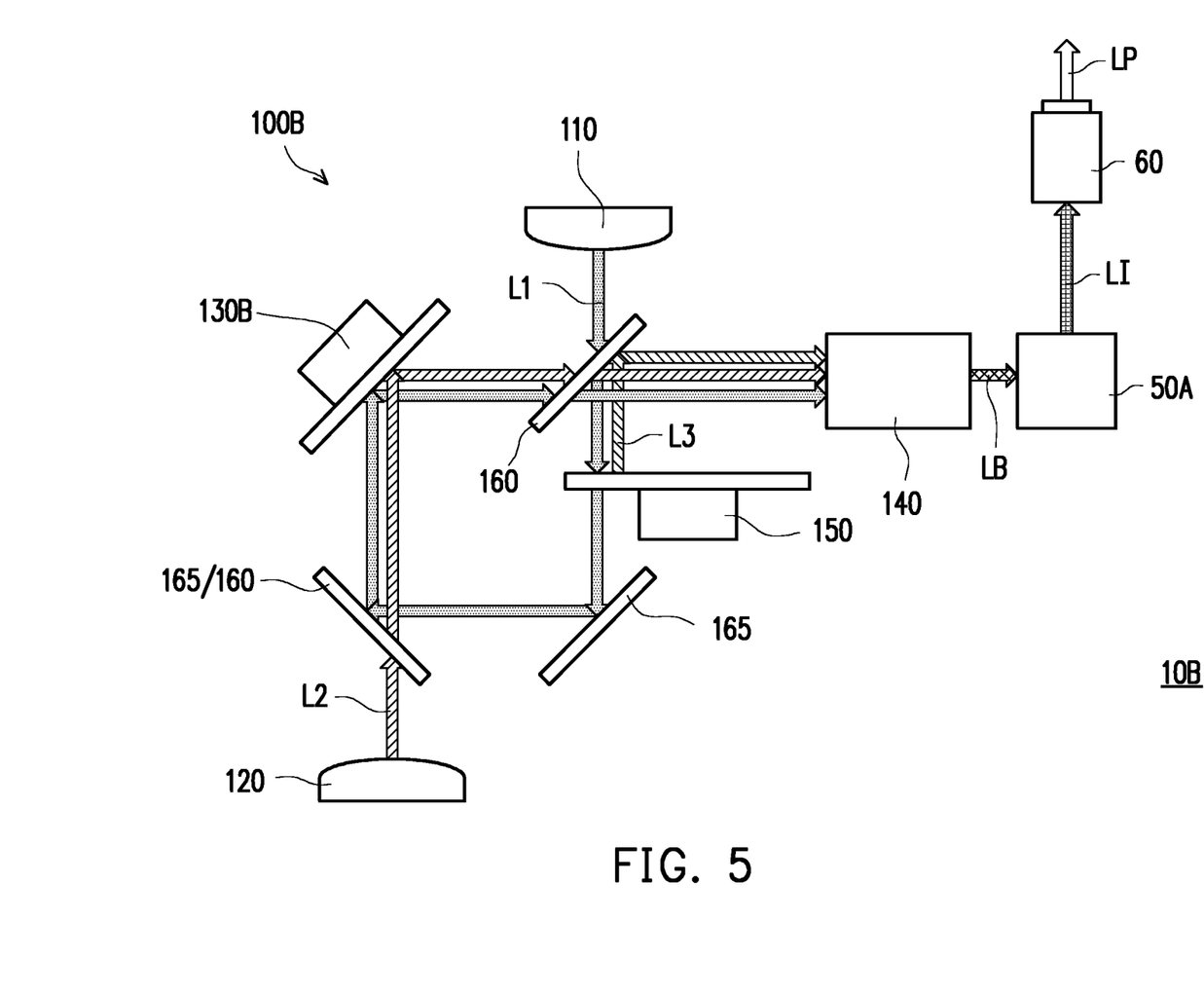
FIG. 5 is a schematic diagram of the projection device according to another embodiment of the invention.

FIG. 5 is a schematic diagram of the projection device according to another embodiment of the invention. The following description refers to FIG. 5. A projection device 10B of this embodiment is similar to the projection device 10A of FIG. 4. The difference between the two is that a polarization rotation device 130B of an illumination system 100B of the projection device 10B further uses a structure having diffusion particles or other structures with the effect of diffusing light beams. Therefore, compared to the projection device 10A of FIG. 4, it is not required to dispose the diffusion element 180. Also, since the number of the light valves 50A of the projection device 10B is two (e.g., two digital micro-mirror devices (2-DMD) are used), it is not required to dispose the filter device 170 (shown in FIG. 1). Accordingly, the occupied volume of the projection device 10B may be reduced, and the user may observe the 3D display with better uniformity through the polarization stereoscopic glasses.

Figure 6:
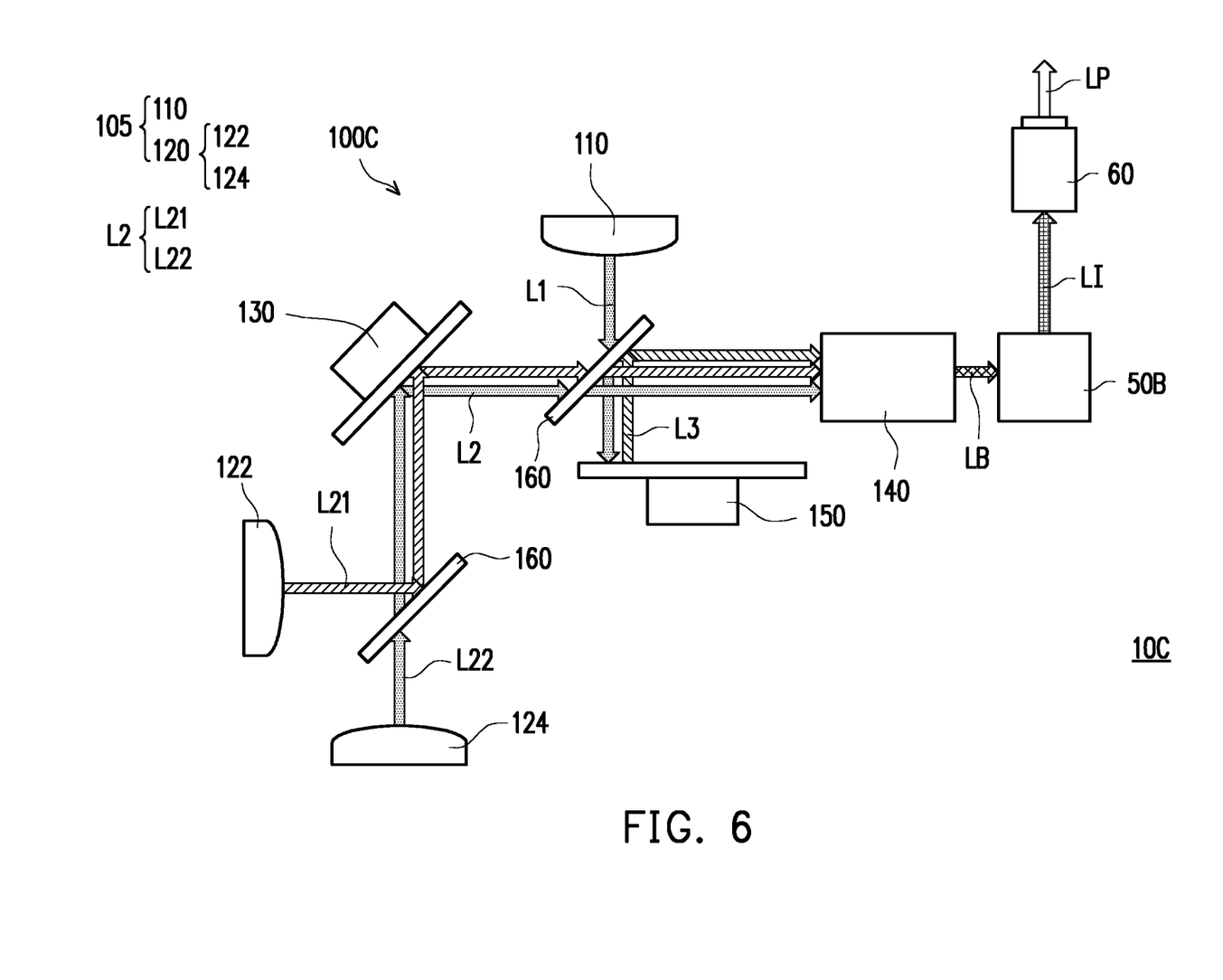
FIG. 6 is a schematic diagram of the projection device according to another embodiment of the invention.

FIG. 6 is a schematic diagram of the projection device according to another embodiment of the invention. The following description refers to FIG. 6. A projection device 10C of this embodiment is similar to the projection device 10 of FIG. 1. The difference between the two is that, in this embodiment, the wavelength conversion element 150 is not disposed with the light transmissive region but simply configured to convert the excitation light beam L1 incident thereon entirely into the excited light beam L3. Also, the number of the light valves 50B is three (e.g., the projection device 10C uses three digital micro-mirror devices (3-DMD)). In an illumination system 100C of the projection device 10C of this embodiment, the auxiliary light source 120 further includes a first auxiliary light source 122 and a second auxiliary light source 124. The auxiliary light beam L2 includes a first auxiliary light beam L21 and a second auxiliary light beam L22. Here, the first auxiliary light source 122 provides the first auxiliary light beam L21, and the second auxiliary light source 124 provides the second auxiliary light beam L22. In this embodiment, the first auxiliary light source 122 is a red laser diode or a red laser diode array, and the second auxiliary light source 124 is a blue laser diode or a blue laser diode array.

The at least one light splitting element 160 is disposed on the transmission path of the excitation light beam L1 or the auxiliary light beam L2. For instance, in this embodiment, the at least one light splitting element 160 includes a dichroic mirror that reflects green and orange light (DMGO) and a dichroic mirror that reflects red light (DMR). Here, the dichroic mirror that reflects red light (the light splitting element 160) is located between the first auxiliary light source 122 and the second auxiliary light source 124, and configured to reflect the first auxiliary light beam L21 and allow the second auxiliary light beam L22 to pass through, so as to guide the first auxiliary light beam L21 and the second auxiliary light beam L22 to the polarization rotation device 130. Nonetheless, in other embodiments, the dichroic mirror that reflects blue light (DMB) may also be selected and disposed. However, the invention is not limited in this regard. The dichroic mirror that reflects green and orange light (the light splitting element 160) is located between the light uniformizing element 140 and the polarization rotation device 130, and configured to reflect the excited light beam L3 and allow the excitation light beam L1 and the auxiliary light beam L2 (the first auxiliary light beam L21 and the second auxiliary light beam L22) to pass through, so all the required beams can be collected and transmitted to the light uniformizing element 140. In different embodiments, configuration and type of the light splitting element 160 may be changed according to different types of the illumination system 100. Forms and types of the light splitting element 160 are not particularly limited by the invention.

Accordingly, when two projection devices 10C are in the polarization stereoscopic mode (i.e., when polarizers are disposed outside the projections lenses 60 or polarizers are built in two projection devices 10C), after passing through the polarization rotation devices 130 of two projection devices 10C and the sequentially passing the projection lenses 60 and the polarizers, the beams can form the images with uniform color and brightness on the screen so that the user can observe the 3D display with better uniformity through the polarization stereoscopic glasses. In this embodiment, the diffusion element 180 shown in FIG. 4 or the polarization rotation device 130B with the structure having diffusion particles or other structures with the effect of diffusing light beams (shown in FIG. 5) may also be selectively disposed. The invention is not limited in this regard.

Figure 7:
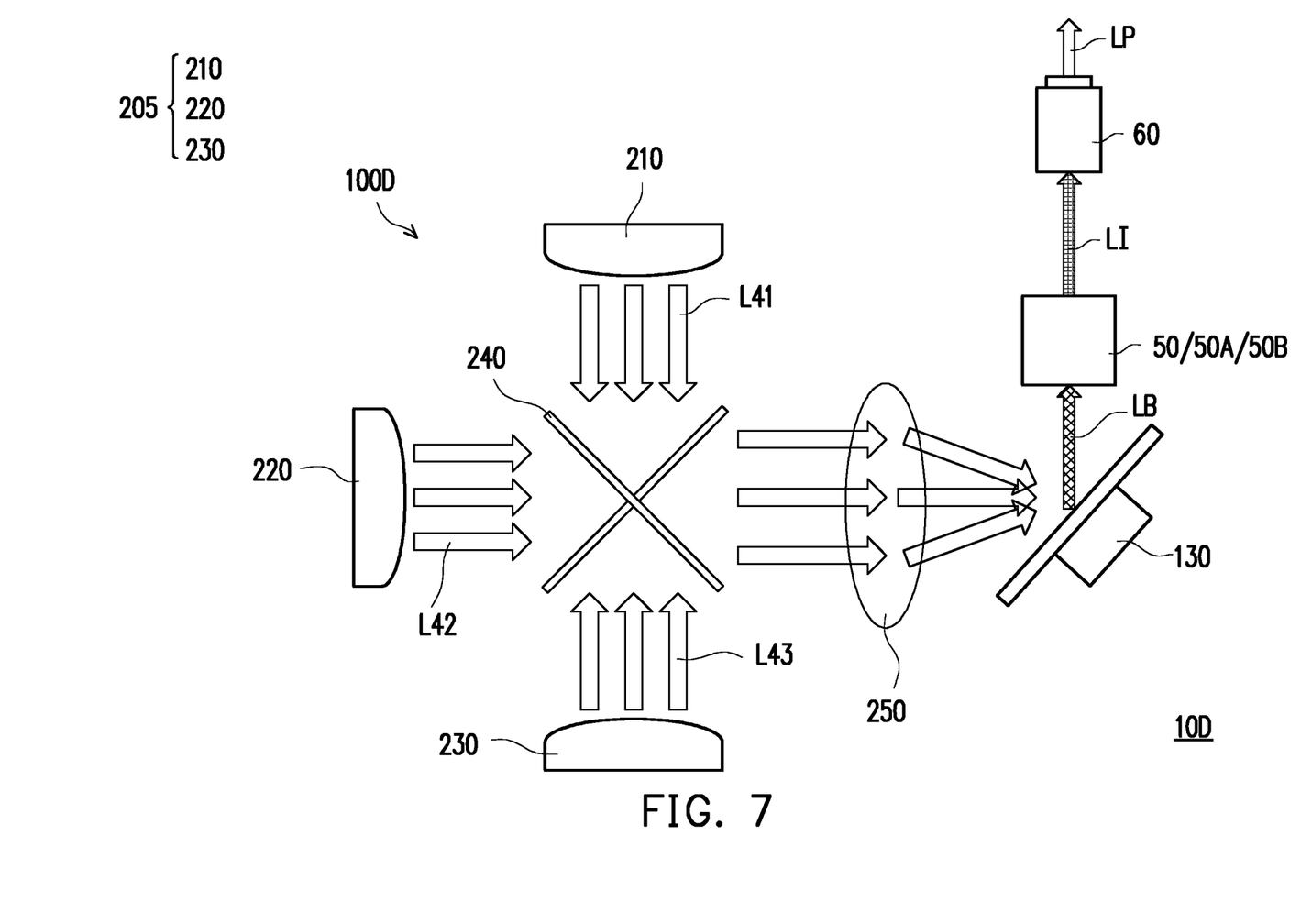
FIG. 7 is a schematic diagram of the projection device according to another embodiment of the invention.

FIG. 7 is a schematic diagram of the projection device according to another embodiment of the invention. The following description refers to FIG. 7. A projection device 10D of this embodiment is similar to the projection device 10A of FIG. 6. The difference between the two is that, in an illumination system 100D of the projection device 10D, a light source 205 includes a red light source 210, a green light source 220 and a blue light source 230, which can provide a red light beam L41, a green light beam L42 and a blue light beam L43, respectively. Here, each of the red light source 210, the green light source 220 and the blue light source 230 may be composed of a plurality of laser diodes. The light beams emitted from the red light source 210, the green light source 220 and the blue light source 230 pass through the light combining element 240 to be transmitted to an optical focusing element 250. After being transmitted through, the light beams emitted from the light source 205 may be further transmitted to the polarization rotation device 130, and then transmitted to the light valve 50 by reflection of the polarization rotation device 130. In this embodiment, the light valve 50A of FIG. 4 or the light valve 50B of FIG. 6 may also be selected and used as the light valve 50, which is not particularly limited by the invention.

Accordingly, when two projection devices 10D are in the polarization stereoscopic mode (i.e., when polarizers are disposed outside the projections lenses 60 or polarizers are built in two projection devices 10D), after passing through the polarization rotation devices 130 of two projection devices 10D and the sequentially passing the projection lenses 60 and the polarizers, the beams can form the images with uniform color and brightness on the screen so the user can observe the 3D display with better uniformity through the polarization stereoscopic glasses. In this embodiment, the diffusion element 180 shown in FIG. 4 or the polarization rotation device 130B with the structure having diffusion particles or other structures with the effect of diffusing light beams (shown in FIG. 5) may also be selectively disposed. The invention is not limited in this regard.

In summary, the embodiments of the invention have at least one of the following advantages and effects. In the polarization rotation device or the projection device disposed with the polarization rotation device of then invention, the driving element is configured to drive the polarization element to rotate with the rotation shaft as the rotation center axis. Therefore, the excitation light beam may pass through the polarization element, and may then be transmitted to pass through the polarization element by reflection of the reflective element. The excitation light beam exiting from the polarization rotation device has different polarization states at different time periods. As a result, when the projection device in the polarization stereoscopic mode (i.e., with the polarizers additionally disposed outside the projection lens), the 3D displayed image may have uniform color or brightness so the user can observe the 3D display with better uniformity through the polarization stereoscopic glasses.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Any of the embodiments or any of the claims of the invention does not need to achieve all of the objects, advantages or features disclosed by the invention. Moreover, the abstract and the invention name in this disclosure are merely used to aid in searches of patent files and are not intended to limit the scope of the claims of the invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A polarization rotation device, comprising: a rotation shaft, a driving element, a polarization element and a reflective element, wherein:
the driving element is connected to the rotation shaft to drive the rotation shaft to rotate;
the polarization element is connected to the rotation shaft and disposed on a transmission path of at least one excitation light beam; and
the reflective element is disposed on a side of the polarization element facing the driving element and located between the polarization element and the driving element, wherein the driving element is configured to drive the polarization element to sequentially rotate with the rotation shaft as a rotation center axis, when the polarization element rotates, the at least one excitation light beam is transmitted to the polarization element and passes through the polarization element and is again transmitted to and passes through the polarization element by reflection of the reflective element, and the at least one excitation light beam outputting from the polarization rotation device has different polarization states at different time periods,
wherein the at least one excitation light beam is transmitted to a central region of the polarization element.

2. The polarization rotation device according to claim 1, wherein the reflective element comprises a body and a reflective layer, and the reflective layer is formed on the body and located between the body and the polarization element.

3. The polarization rotation device according to claim 1, wherein the reflective element is formed by a coating manner on the side of the polarization element facing the driving element.

4. The polarization rotation device according to claim 1, wherein the reflective element comprises a diffusion layer configured to scatter the at least one excitation light beam.

5. The polarization rotation device according to claim 1, wherein the at least one excitation light beam forms a light spot on the polarization element, and a distance between a geometric center position of the light spot and a central position of the central region of the polarization element is less than or equal to 10 mm.

6. The polarization rotation device according to claim 1, wherein the polarization element is a half-wave plate, a quarter-wave plate, a depolarizer, a circular polarizer, or a combination of the quarter-wave plate and a linear polarizer.

7. The polarization rotation device according to claim 1, further comprising:
an anti-reflection layer, disposed on a light incidence surface of the polarization element, the light incidence surface being located on a side far away from the driving element.

8. The polarization rotation device according to claim 1, wherein when the at least one excitation light beam is incident on the polarization element, the at least one excitation light beam has an included angle less than or equal to 85 degrees with respect to a light incidence surface of the polarization element.

9. A projection device, comprising an illumination system, at least one light valve and a projection lens, wherein:
the illumination system is configured to provide an illumination light beam, and the illumination system comprises at least one excitation light source and a polarization rotation device, wherein:
the at least one excitation system is configured to provide at least one excitation light beam; and
the polarization rotation device comprises a rotation shaft, a driving element, a polarization element and a reflective element, the driving element is connected to the rotation shaft to drive the rotation shaft to rotate, the polarization element is connected to the rotation shaft and disposed on a transmission path of the at least one excitation light beam, the reflective element is disposed on a side of the polarization element facing the driving element and located between the polarization element and the driving element, and the illumination light beam comprises a part of the at least one excitation light beam;
the at least one light valve is disposed on a transmission path of the illumination light beam and configured to convert the illumination light beam into an image light beam; and
the projection lens is disposed on a transmission path of the image light beam and configured to convert the image light beam into a projection light beam, wherein the driving element is configured to drive the polarization element to sequentially rotate with the rotation shaft as a rotation center axis, when the polarization element rotates, the at least one excitation light beam is transmitted to the polarization element and passes through the polarization element and is again transmitted to and passes through the polarization element by reflection of the reflective element, and the at least one excitation light beam outputting from the polarization rotation device has different polarization states at different time periods,
wherein the at least one excitation light beam is transmitted to a central region of the polarization element.

10. The projection device according to claim 9, wherein the reflective element comprises a body and a reflective layer, and the reflective layer is formed on the body and located between the body and the polarization element.

11. The projection device according to claim 9, wherein the reflective element is formed by a coating manner on the side of the polarization element facing the driving element.

12. The projection device according to claim 9, wherein the reflective element comprises a diffusion layer configured to scatter the at least one excitation light beam.

13. The projection device according to claim 9, wherein the at least one excitation light beam forms a light spot on the polarization element, and a distance between a geometric center position of the light spot and a central position of the central region of the polarization element is less than or equal to 10 mm.

14. The projection device according to claim 9, wherein the polarization element is a half-wave plate, a quarter-wave plate, a depolarizer, a circular polarizer, or a combination of the quarter-wave plate and a linear polarizer.

15. The projection device according to claim 9, wherein the polarization rotation device further comprises an anti-reflection layer, disposed on a light incidence surface of the polarization element, the light incidence surface being located on a side far away from the driving element.

16. The projection device according to claim 9, wherein the illumination system further comprises a wavelength conversion element and a light uniformizing element, and the wavelength conversion element is disposed on the transmission path of the at least one excitation light beam and is located between the at least one excitation light source and the light uniformizing element.

17. The projection device according to claim 9, wherein the illumination system further comprises a filter device and a light uniformizing element, and the filter device is disposed between the at least one excitation light source and the light uniformizing element.

18. The projection device according to claim 9, wherein when the at least one excitation light beam is incident on the polarization element, the at least one excitation light beam has an included angle less than or equal to 85 degrees with respect to a light incidence surface of the polarization element.

* * * * *